US006816308B1

(12) United States Patent
Shopp (10) Patent No.: US 6,816,308 B1
(45) Date of Patent: Nov. 9, 2004

(54) SCREEN SYSTEM

(75) Inventor: Rick A. Shopp, New Castle, IN (US)

(73) Assignee: Draper, Inc., Spiceland, IN (US)

( * ) Notice: Subject to any disclaimer, the term of this patent is extended or adjusted under 35 U.S.C. 154(b) by 0 days.

(21) Appl. No.: 10/385,830

(22) Filed: Mar. 11, 2003

Related U.S. Application Data

(60) Continuation of application No. 09/495,648, filed on Feb. 1, 2000, now Pat. No. 6,532,109, which is a division of application No. 08/859,027, filed on May 20, 1997, now Pat. No. 6,137,629.

(51) Int. Cl.[7] .............................. G03B 21/56; E06B 9/08
(52) U.S. Cl. ................. 359/461; 248/223.41; 160/23.1
(58) Field of Search ................ 359/443, 461; 248/220.21, 223.41, 254, 262, 267; 160/23.1, 239

(56) References Cited

U.S. PATENT DOCUMENTS

| 4,045,123 A | 8/1977 | Brown |
| 4,060,310 A | 11/1977 | Brown |
| 4,072,404 A | 2/1978 | Brown |
| 4,159,162 A | 6/1979 | Christoffel |
| 4,403,761 A | 9/1983 | Jamar ...................... 248/447.1 |
| 5,274,499 A | 12/1993 | Shopp |
| 5,296,964 A * | 3/1994 | Shopp ........................ 359/443 |
| 5,323,831 A | 6/1994 | Manthei |
| 5,341,241 A | 8/1994 | Shopp |
| 5,523,880 A | 6/1996 | Pidgeon et al. |
| 5,647,421 A | 7/1997 | Hoffman et al. ............ 160/120 |
| 5,848,634 A | 12/1998 | Will et al. |
| 6,100,659 A | 8/2000 | Will et al. |
| 6,201,364 B1 | 3/2001 | Will et al. |
| 6,336,616 B1 * | 1/2002 | Lin ........................ 248/222.11 |
| 6,532,109 B1 * | 3/2003 | Shopp ........................ 359/461 |
| 6,595,262 B2 * | 7/2003 | Chen .......................... 160/23.1 |

OTHER PUBLICATIONS

Product brochure entitled "Products for Visual Communication," by Draper Shade & Screen Co., Incl. of Spiceland Indiana, 1995.
Somfy Systems, Inc., "Why Stop With a Motor?" flyer, 1986.
MechoShade Systems, Inc, "ElectroShade® II DoubleShade Bracket #13 with 5113 Pocket" flyer, 1998.
MechoShade Systems, Inc., "The Mecho/Electro Shade™ System: Pockets & Accessorites" flyer, 1994.
Somfy: "Automatic Control Systems"; Somfy Pre–Assembled Pug–In Wiring Systems; date unknown.
Draper, Inc. "Products for Visual Communication": 11132/DRC; BuyLine 3260; Catalogue, 1996.

* cited by examiner

*Primary Examiner*—Christopher E Mahoney
(74) *Attorney, Agent, or Firm*—Bose McKinney & Evans LLP (57) ABSTRACT

A screen system is disclosed. The screen system includes a screen housing, a screen positionable in the screen housing, and a screen mount. The screen mount is configured to support the screen in the screen housing.

20 Claims, 8 Drawing Sheets

SCREEN SYSTEM

This application is a continuation of U.S. patent application Ser. No. 09/495,648, filed Feb. 1, 2000, now U.S. Pat. No. 6,532,109, which is a divisional of U.S. patent application Ser. No. 08/859,027, filed May 20, 1997, now U.S. Pat. No. 6,137,629, the disclosures of which are expressly incorporated by reference herein.

BACKGROUND AND SUMMARY OF THE INVENTION

The present invention pertains to projection screen systems, and, in particular, to systems of the type in which a projection screen may be unwound from around a roller positioned in a housing so as to be lowered to a viewing arrangement.

Projection screen systems in numerous forms are gaining frequent application in a variety of venues, including conference rooms in office buildings and home entertainment systems. Many such systems include an electrical motor that powers the raising and lowering of the screen relative to a housing that holds the screen mounting roller. The projection screen either winds on the roller or unwinds from the roller depending on the direction of rotation of the motor. Projection screen systems of this type frequently are completely installed into a building or structure at one time. During this installation process, an electrician is required to hardwire a power conduit within the structure to the projection screen system. The electrician then electrically connects the exposed wire leads of the power cord extending from the motor to this power conduit, and manipulates these electrical connections into a junction box mounted within the housing. One shortcoming of this one time system installation process is that the installed projection screen may be subjected to dust, dirt and other risks of damage that are inherent in being located in a construction zone for potentially long periods of time. However, installing the projection screen housing to the structure during a first stage of construction and then the projection screen during a subsequent stage of construction may be cost prohibitive. In particular, hiring an electrician to return to the building to wire the motor to the power conduit already installed by an electrician during building construction may increase installation costs appreciably.

Another shortcoming of many projection screen systems is the difficulty or inconvenience of properly positioning the projection screen within a room in which it is to be viewed. On occasion, whether it be due to an incorrect measurement during installation or a properly performed installation into a room that is subsequently altered before construction is finished, a person who lowers the screen for use may discover the screen to be off-center or improperly positioned within the room. For projection screen systems that support the screen mounting roller at the housing end caps, longitudinal adjustments of the screen may require the entire housing be moved to adjust the projection screen positioning. Other known systems of the type that employ roller mounting brackets that are attached with screws to the housing do allow the position of the roller to be adjusted without moving the system housing. However, this adjustment operation, as well as the process of initially installing the screen mounting roller, may be awkward and difficult for an installer to perform. In particular, this process requires the installer to hold the roller mounting brackets in place, typically above his or her head, while the brackets are initially attached, or detached and reattached in situations where a change in screen positioning is desired.

Another problem with some projection screen systems is that their construction frequently leaves little margin for error in the installation process. For example, if the housing is initially installed backwards with the wrong part of the housing facing into the room in which the projection screen is to be used, the housing must be removed, turned around and reinstalled. In addition, on occasion when the fully assembled system is operated and the screen is lowered, it may be discovered that the projection screen is too close to the wall to clear any artwork displayed on that wall. Even if that projection screen was installed to roll off the back of the roller within the housing, the roller typically is not capable of being quickly removed and reinstalled to allow the screen to roll off the front edge of the roller. This shortcoming is because the closure panel that partially blocks off the underside opening of the housing may not be readily installable to the back wall of the housing instead of the front wall where the panel was initially installed.

According to the present invention, a screen system is provided. The screen system includes a screen housing, a screen, and a screen mount. The screen housing has first and second ends and defines an interior region. The screen is positioned in the interior region of the housing. The screen mount includes first and second screen mount members supported by the screen housing in positions spaced apart from the first and second ends of the screen housing. The screen mount is coupled to the screen to support the screen in the screen housing. At least one of the first and second screen mount members is movable relative to the screen housing while supported by the screen housing.

According to another aspect of the present invention, a screen system is provided that includes a screen housing, a screen, and a first screen mount member. The screen housing has first and second ends and a plurality of interactive members. The screen housing defines an interior region. The screen is positioned in the interior region of the screen housing. The first screen mount member is configured to support the screen in the screen housing. The first screen mount member includes a plurality of interactive members. Rotation of the first screen mount member relative to the screen housing engages the interactive members of the first screen mount member with the interactive members of the screen housing to support the first screen mount member relative to the screen housing.

According to another aspect of the present invention, a screen system is provided that includes a screen housing, a screen, and first and second screen mount members. The screen housing has first and second ends and defines an interior region. The screen is positionable in the interior region of the screen housing. The first and second screen mount members are configured to support the screen in the interior region of the screen housing. The screen housing is configured to support the first and second screen mount members before the screen is supported by the first and second screen mount members.

BRIEF DESCRIPTION OF THE DRAWINGS

The above mentioned and other advantages and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the drawings represent an embodiment of the invention, the drawings are not necessarily to scale and certain features may be exaggerated or omitted in some of the drawings in order to better illustrate and explain the present invention.

DESCRIPTION OF THE PREFERRED EMBODIMENTS

Figure 1:
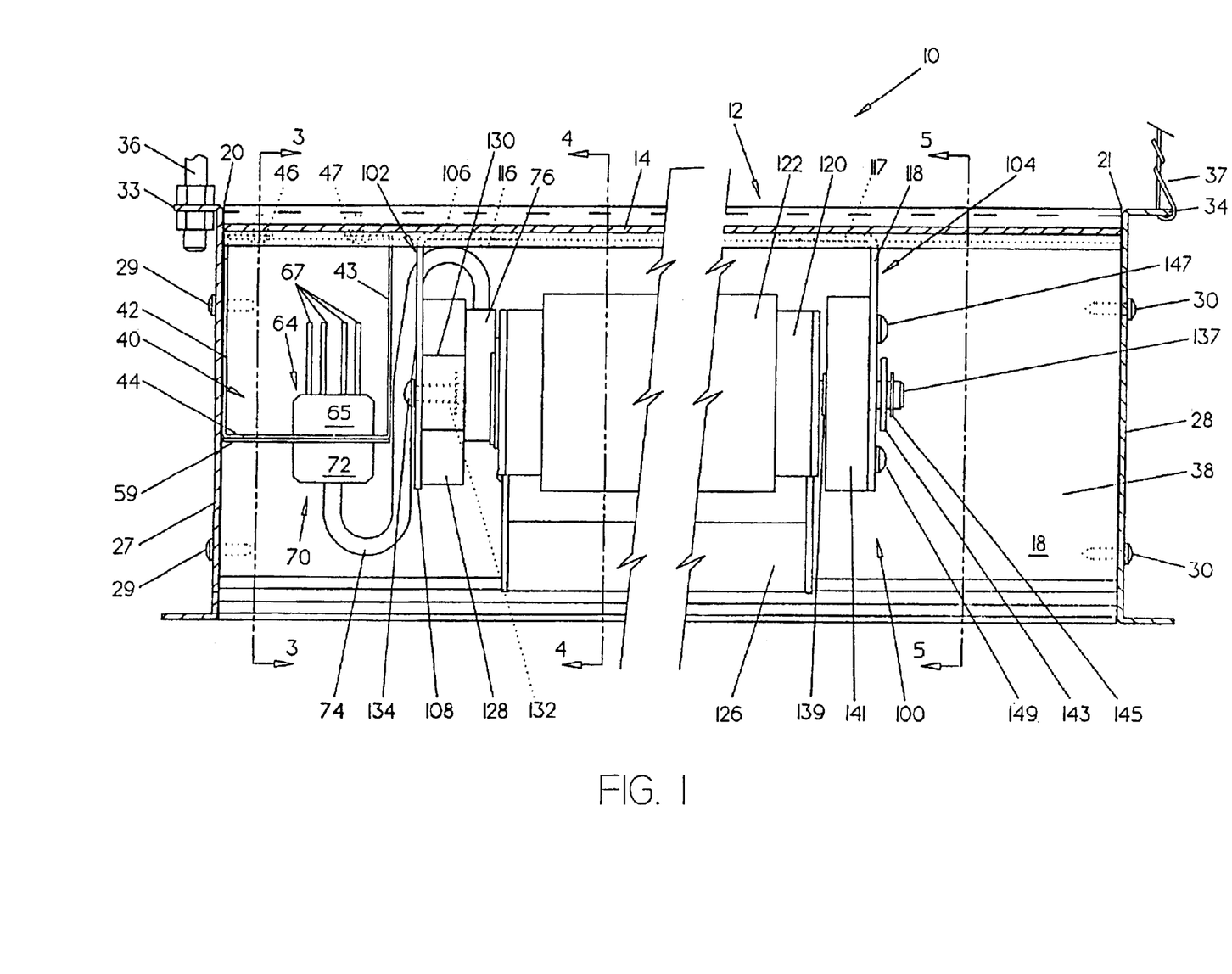
FIG. 1 is a fragmentary front view of an assembled projection screen system of the present invention, wherein the system is partially shown in longitudinal cross-section and wherein the bottom closure panel is not shown.
Figure 2:
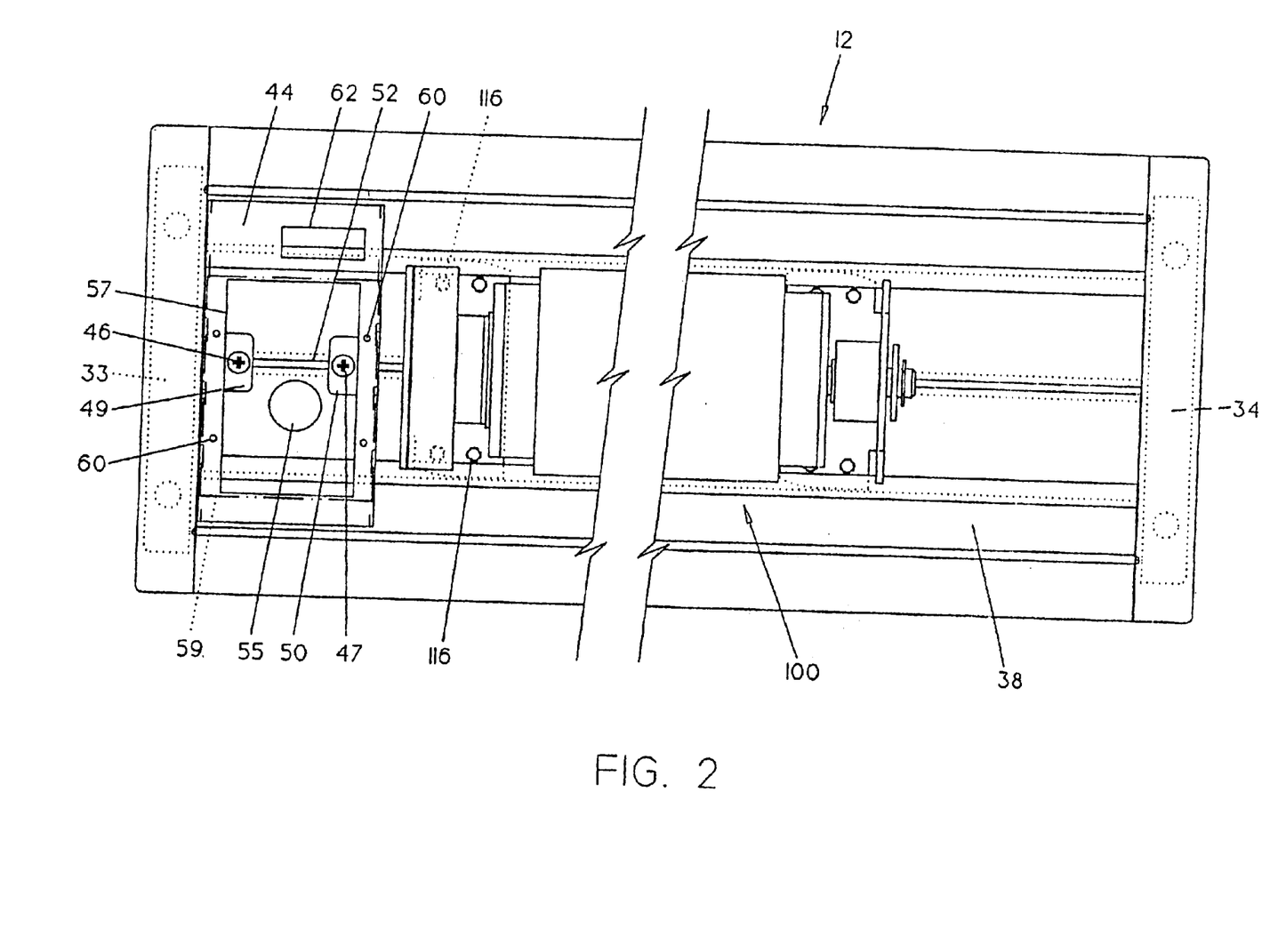
FIG. 2 is a fragmentary bottom view of the projection screen system of FIG. 1, wherein the junction box cover, the electrical circuitry extending from the motor and within the junction box, and the weighted bottom portion of the projection screen have been removed for purposes of illustration.
Figure 3:
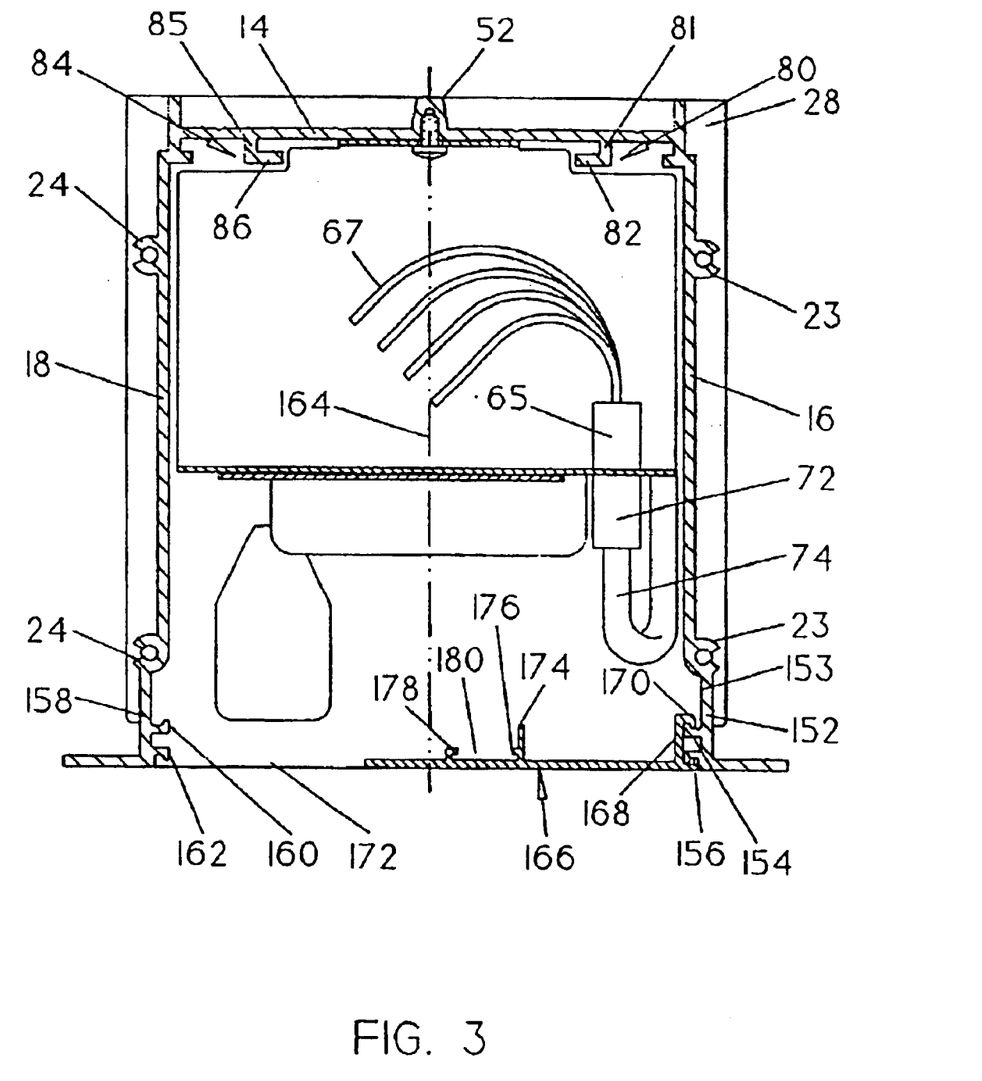
FIG. 3 is a cross-sectional end view, taken along line 3—3 of FIG. 1, of the projection screen system of FIG. 1, wherein the bottom closure panel is shown installed.
Figure 4:
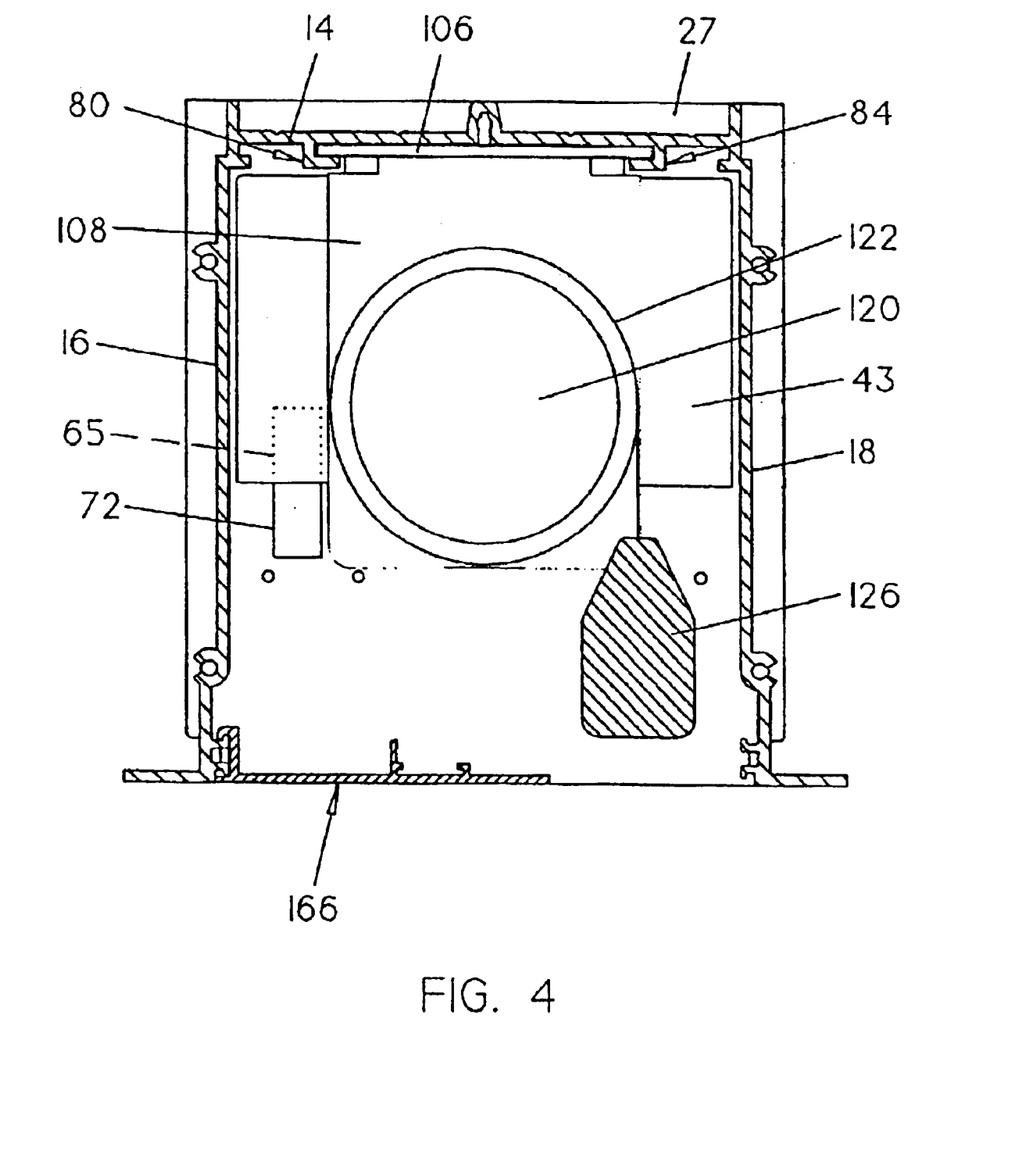
FIG. 4 is a cross-sectional end view, taken along line 4—4 of FIG. 1, of the projection screen system of FIG. 1, wherein the bottom closure panel is shown installed, wherein the plug and socket connectors of the electrical circuitry are abstractly shown without their associated wiring, and wherein the roller and projection screen are not shown in cross-section.
Figure 5:
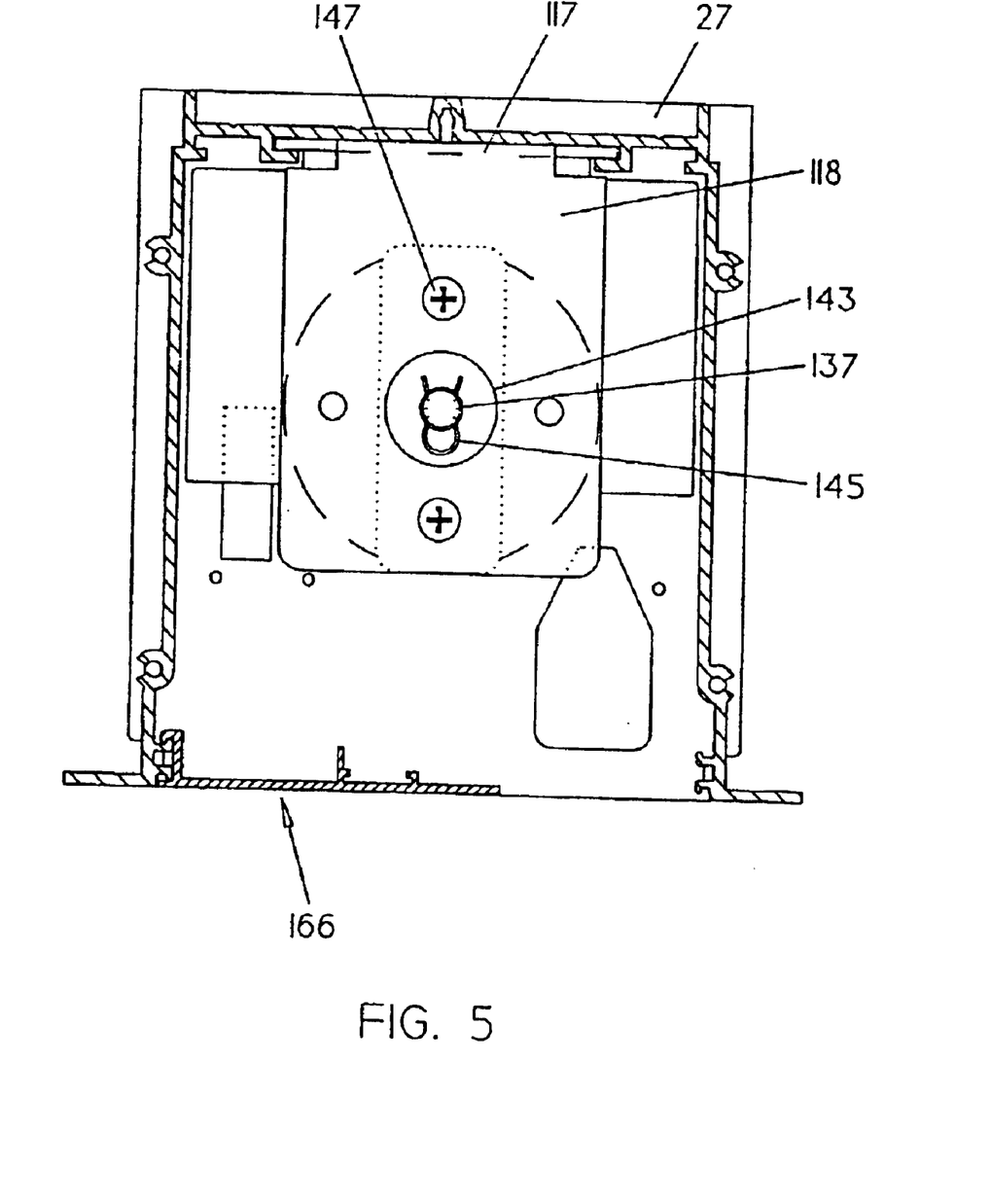
FIG. 5 is a cross-sectional end view, taken along line 5—5 of FIG. 1, of the projection screen system of FIG. 1, wherein the bottom closure panel is shown installed, and wherein the plug and socket connectors of the electrical circuitry are abstractly shown without their associated wiring.

Referring now to FIGS. 1–5, there are shown various views of an exemplary embodiment of a projection screen system, generally designated 10, of the present invention in a screen storage arrangement. System 10 includes a protective housing 12 formed of a top wall or panel 14 having opposite side edge portions from which downwardly extend side wall 16 and side wall 18. The shown orthogonal configuration of side walls 16 and 18 with respect to top wall 14 results in housing 12 having an inverted square U-shaped configuration, but other wall arrangements may be utilized in alternate embodiments. Housing 12 is fabricated from a lightweight and strong material such as aluminum. Housing 12 is preferably formed in one-piece in an extrusion process, but may be formed in alternate fashions, such as by rigidly interconnecting separate panels or plates. Along its longitudinal length that extends from end 20 to end 21, housing 12 is uniformly configured, and therefore the shapes of the housing shown in FIGS. 3–5 are representative rather than merely coincidentally similar. In the shown embodiment, housing 12 is symmetrical about a vertical plane longitudinally extending through line 164 shown in FIG. 3, and therefore housing 12 may be installed such that either side wall 16 or side wall 18 is the front wall (i.e. the housing wall closer to the center of the room in which projection screen system 10 is to be viewed).

Housing side wall 16 includes a pair of screw channels 23, and side wall 18 includes a pair of screw channels 24. End cap 27 is attached to housing 12 by four screws 29 that insert into screw channels 23 and 24 and closes off the end of the interior volume defined by housing 12. End cap 28 is similar attached with screws 30 to cap the opposite housing end. End caps 27 and 28 are formed of a high strength material, such as steel. End caps 27, 28 respectively include upper flanges 33, 34 that each include two apertures as shown in dotted lines in FIG. 2. The apertured flanges 33, 34 may be attached to a support member of a structure in which projection screen system 10 is to be installed with any of a variety of conventional fasteners, such as threaded rods with locking nuts and wires as indicated in FIG. 1 at 36 and 37, respectively. Housing 12 may alternatively be directly attached to the support member by fasteners that extend through a housing wall, such as top wall 14.

Installed within the interior volume 38 formed by walls 14, 16 and 18 is a junction box, generally designated 40, that furnishes a protected compartment for the electrical connections between projection screen system 10 and a conduit to the installation structure's power supply. Junction box 40 includes vertical side flanges 42 and 43 and a bottom facing horizontal flange 44 that substantially span the entire horizontal space between side walls 16 and 18. Self-tapping screws 46 and 47 that fit through tabs 49, 50 horizontally extending from box flanges 42, 43 insert into a screw channel 52 formed into housing top wall 14 to mount junction box 40 to housing 12. Junction box 40 may be manufactured by orthogonally bending a suitably sized and shaped single piece of sheet metal into the shown configuration.

Junction box 40 is positioned directly below an entry hole 55 in housing top wall 14 through which an electrical conduit (not shown) connected to a structure's power supply can be inserted. Bottom flange 44 includes a rectangular opening 57 which allows access to the interior or contents of box 40. A junction box cover plate 59, shown in dashed lines in FIG. 2, is attached to bottom flange 44 with not shown screws that insert through four holes 60 in flange 44. A second opening 62 adapted to installably receive a power connector is also provided through bottom flange 44.

Mounted to junction box 40 and positioned within the interior of box 40 is a power connector abstractly shown in FIG. 1 at 64. Connector 64 includes a socket portion 65 from which extend four wire leads 67. Socket portion 65 snap fits into flange opening 62 during installation so as to permit its connection with a complementary power connector in a convenient fashion and without removing cover plate 59. Socket portion 65 includes hollows or sockets within its body that receive projecting plugs of a plug portion of a power connector. In the shown embodiment in which four wire leads 67 are employed, socket portion 65 includes four separate plug receiving sockets. Wire leads 67, with the use of wire nuts (not shown), are attached to the end of the electrical conduit (not shown) hardwired into the building. A quick disconnect power connector external to junction box 40 is shown at 70 and includes a plug portion 72 from which project individual plugs insertable into the sockets of power connector 64. Power connector 70 is circuited with a power cord 74 connected to screen motor 76. Power connectors 64 and 70 may be readily mated together as described further below to operatively circuit motor 76 to the building's electrical power supply. One suitable type of power connector is available from AMP Incorporated of Harrisburg, Pa. as Universal Mate-N-Lok Connectors. Other styles of plug/socket connectors, as well as other types of connectors readily connectable without handling of potentially hot wiring, may be substituted for the shown connectors 64 and 70 within the scope of the invention.

As shown in FIG. 3, downwardly projecting from top wall 14 are two L-shaped projections or interactive members, generally designated 80 and 84, that extend the longitudinal length of housing 12 and allow for the adjustable attachment of a projection screen assembly to housing 12. Projection 80 includes a vertically projecting flange 81 that terminates with a horizontally extending lip portion 82 pointing toward the middle of top wall 14. The upper surface of lip portion 82 is spaced from the region of top wall 14 which it overlays to provide an insertion space for bracket mounting as described below. Projection 84 is a mirror image of projection 80 and includes flange 85 and lip portion 86, which points toward lip portion 82. Projections 80 and 84 are integrally formed with top wall 14, but in alternate embodiments may be provided on side walls 16 and 18, such as if a roller is to be mounted to that side wall. Differently shaped projections, such as slat-shaped flanges that are inclined relative to top wall 14, may be substituted for the L-shaped projections shown. In addition, the insertion spaces defined by projections 80 and 84 may be provided by recesses provided in the housing walls within the scope of the invention.

Figure 6A:
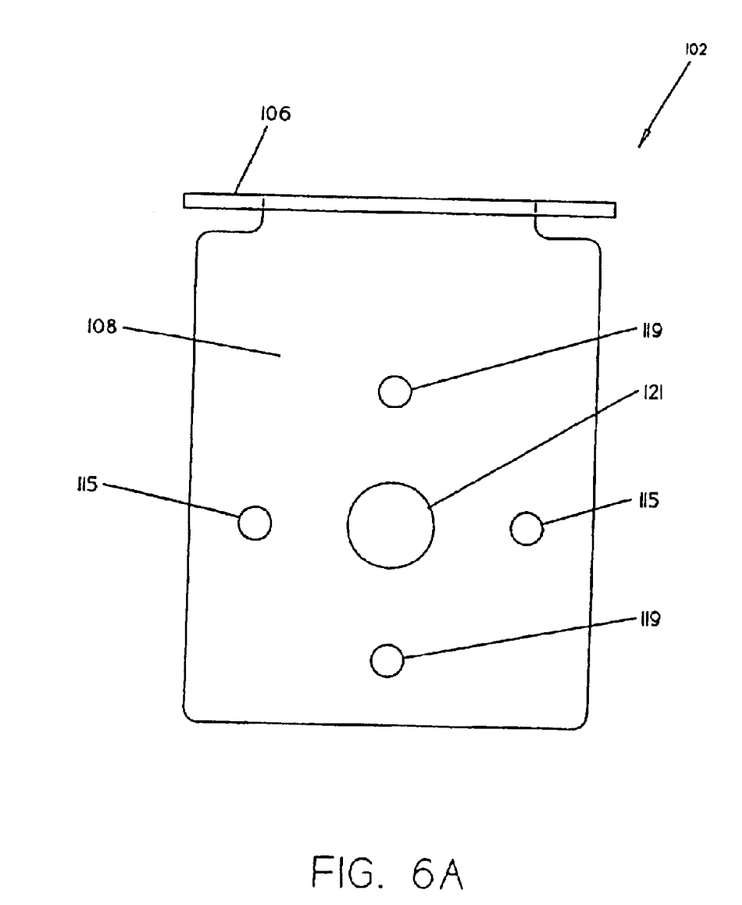
FIGS. 6A and 6B are side and top views of the motor end roller mounting bracket removed from the remainder of the projection screen system of FIG. 1.
Figure 6B:
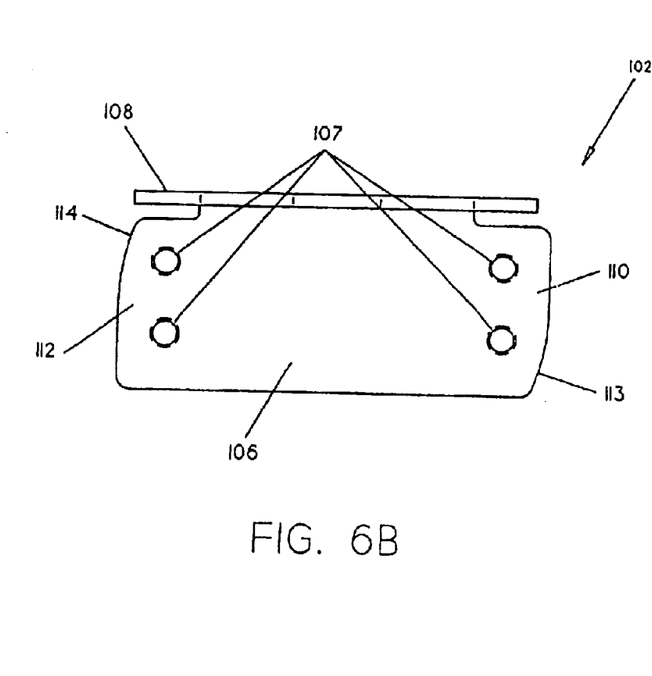

A projection screen assembly that may be readily mounted to housing 12 subsequent to the installation of housing 12 in a building is generally designated 100 and includes a screen mount including first and second screen mount members or brackets 102 and 104 directly attachable to housing 12. FIGS. 6A and 6B are further described as showing views of bracket 102, but this shown bracket configuration enables its use as either bracket 102 or 104, which simplifies manufacture and assembly. Bracket 102 includes an attachment flange 106 from which downwardly extends support flange 108. Four tapped holes 107 through flange 106 receive set screws 116 (See FIG. 1). The end regions 110 and 112 of flange 106 serve as attachment lugs or interactive members. Attachment lugs 110, 112 have a thickness insertable into the space between top wall 14 and the lip portions 82 and 86 of lipped projections 80 and 84. Attachment lugs 110 and 112 further are sized such that the distance from the outward edge of attachment lug 110 to the outward edge of attachment lug 112, as measured in a direction perpendicular to a roller when installed to bracket 102, is greater than the distance between the tips of lip portions 82 and 86 but less than the distance between flanges 81 and 85. Diagonally opposite or catercorner portions 113 and 114 of attachment lugs 110 and 112 are rounded such that the diagonal length therebetween is less than the distance between flanges 81 and 85 to allow a rotational bracket installation described further below. Support flange 108 includes horizontally spaced apertures 115, vertically spaced apertures 119, and a central aperture 121. Apertures 119 and 121 are not used in bracket 102, but when a bracket shaped as shown in FIGS. 6A and 6B is used as bracket 104, such apertures respectively receive dampener mounting screws and an idler shaft as described further below. Bracket 104 is configured identical to bracket 102 and generally includes an attachment flange 117 and support flange 118 (See FIG. 1).

Although configured as an outwardly extending and coplanar continuation of bracket flange 106 in the illustrated embodiment, attachment lugs 110 and 112 may be differently configured within the scope of the present invention. In alternate embodiments, for example, lugs 110 and 112 may be provided as tabs projecting from support flange 108, or as movable members shiftable along attachment flange 106.

Operationally supported by bracket 102 is the electric motor 76 connected to power cord 74. The rotatable output shaft of motor 76 is operationally attached to a cylindrical roller 120 in a well known fashion. Motor 76 includes a square stud (not shown) that projects from the motor housing and inserts into a square throughbore provided in a finned insert (not shown) made of aluminum molded into dampener 128. The finned insert engages the motor housing stud to prevent relative rotation therebetween. Sound dampener 128 is formed of thermoplastic rubber and includes two laterally extending projections 130 into which are integrally molded T-nuts 132. A pair of screws 134 extend through apertures 115 in support flange 108 and engage the internal threads of T-nuts 132 to mount dampener 128 to bracket flange 108.

Shown wound around roller 120 and unwindable therefrom upon roller revolution is a sheet of fabric 122 that serves as a projection screen. Projection screen 122 is shown in FIGS. 1–5 in a retracted position fully stored within the protective housing 12. As is conventional when used as a front projection screen, one surface of fabric sheet 122 is of the type of material on which images may be projected for viewing, and the opposite surface is formed of an opaque material. The lower end of fabric sheet 122 is looped and secured around a dowel abstractly indicated at 126. Dowel 126 serves as a suspended weight that causes screen 122 to descend in a relatively planar configuration as it unwinds from roller 120.

At the end of roller 120 opposite the end to which motor 76 is attached, an idler shaft 137 is fixed to roller 120 to be rotatable therewith. Idler shaft 137 extends through a flanged nylon bushing 139 mounted within thermoplastic rubber dampener 141, and through a central aperture (corresponding to aperture 121 through support flange 108) in support flange 118. Slipped over the end of idler shaft 137 is a washer 143, and spring clip 145 attaches around shaft 137 to prevent shaft 137 from being axially withdrawn through flange 118. Two screws 147, 149 insert through vertically spaced holes through flange 118 to threadedly engage T-nuts (not shown) integrally molded into dampener 141 to mount dampener 141 to flange 118.

With particular reference to FIG. 3, a lipped projection 154 projects inwardly from an interior surface 153 of an outwardly offset lower region 152 of housing side wall 16. A second lipped projection 156 projects from surface 153 below projection 154. Lipped projections 154 and 156 extend the longitudinal length of side wall 16. The outwardly offset lower region 158 of housing side wall 18 similar includes lipped projections 160 and 162, which are mirror images of projections 154 and 156.

A bottom closure panel 166 made of aluminum that extends the entire longitudinal length of housing 12 and which has a uniform cross-section along its length includes an attachment member 168 comprising hook end 170. Closure panel 166 is sized narrower than the space or opening between side walls 16 and 18 such that when attached to either side wall 16 or side wall 18, closure panel 166 defines a slot shaped gap 172 with the side wall to which it is not attached. The projection screen 122 can be lowered and raised through this gap 172 during system operation.

Hook end 170 fits over the upturned lip of lipped projection 154 as shown in FIG. 3 to mount closure panel 166 to side wall 16. The lip of lipped projection 156 provides an enlarged bearing surface against which the side surface of attachment member 168 abuts when installed. An upstanding longitudinal rib 174 stiffens panel 166 to resist panel bowing. Nub 176 that laterally extends from rib 174 and a longitudinally extending L-shaped rib 178 define a channel 180. Not shown brackets insertable into channel 180 at opposite ends of panel 166 include upstanding leaf spring portions with longitudinally projecting pins. Apertures (not shown) on end caps 27 and 28 receive the pins of the leaf spring portions when closure panel 166 is installed to line up the panel housing and prevent panel sag.

Attachment member 168 may be used to attach to either lipped projection 154 or 160 due to the projections complementary structure with member 168. Other detachable, interconnecting structures, including housing recesses or apertures that releasably receive prongs of the closure panel, may be employed within the scope of the invention.

Figure 7:
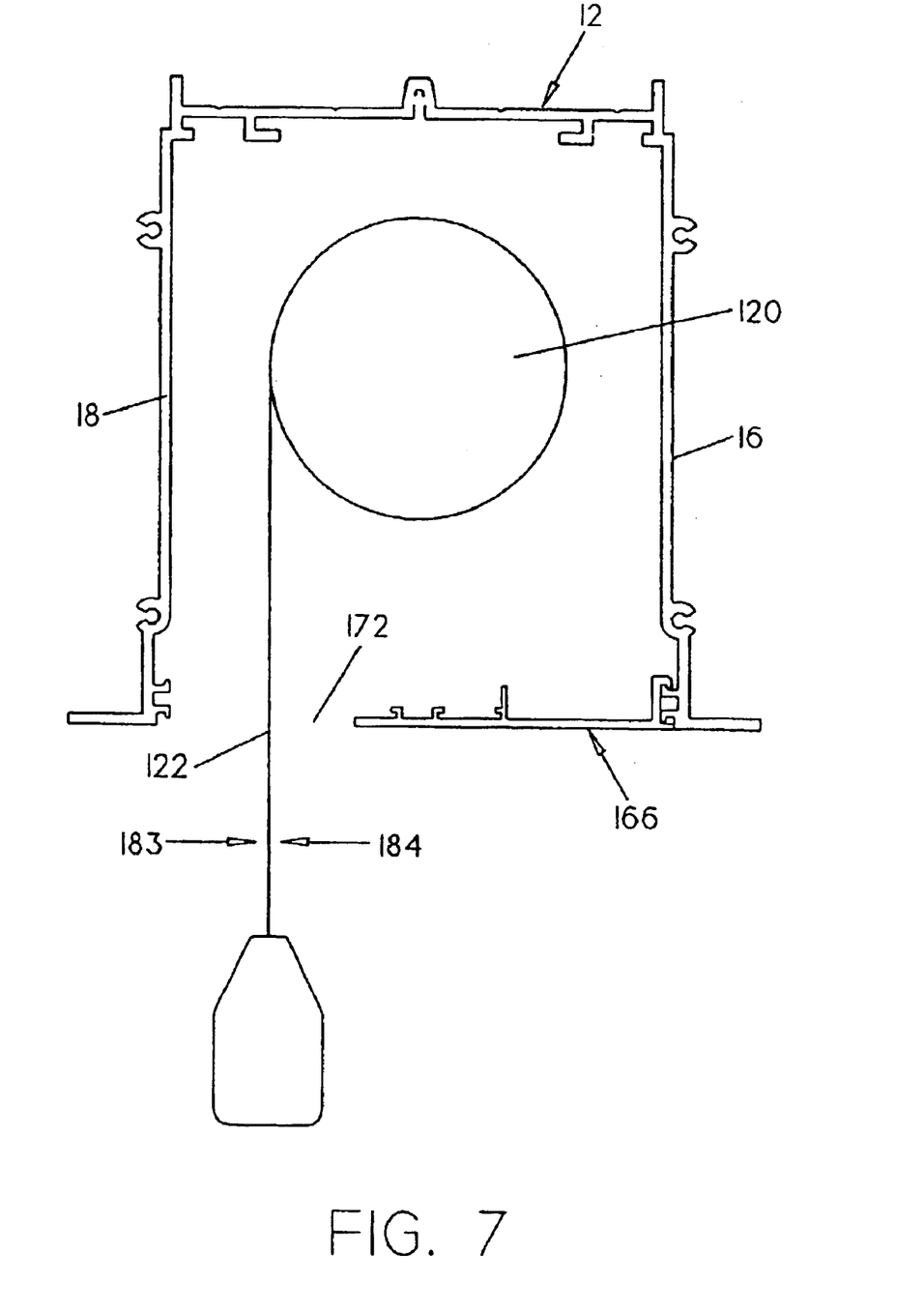
FIGS. 7 and 8 are similar cross-sectional end views diagrammatically showing a bottom closure panel mounted on different side walls of the housing and with the projection screen unwinding from different sides of the roller.
Figure 8:
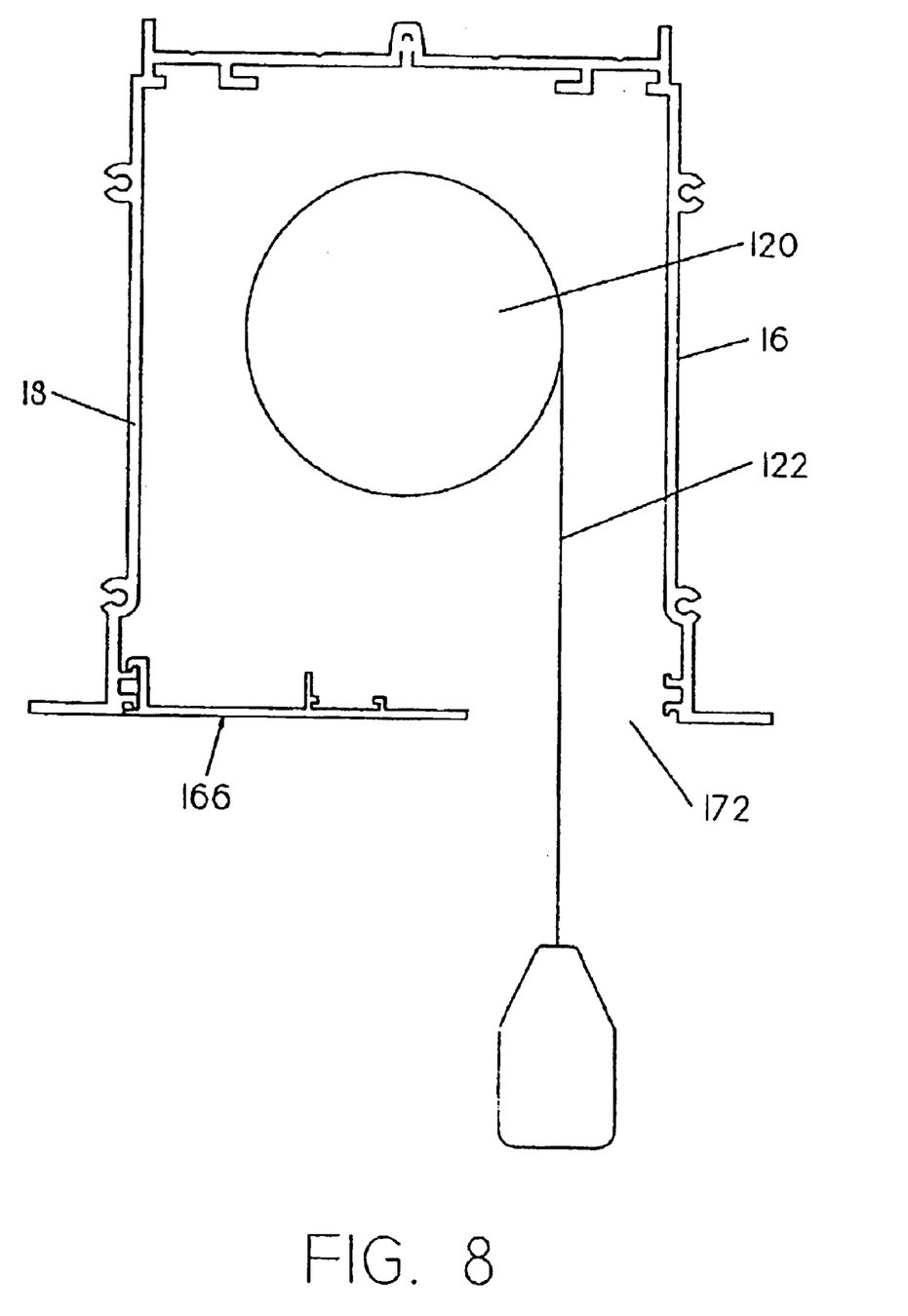

Referring now to FIGS. 7 and 8, the installation adaptability afforded by the configuration of the housing and closure panel of projection screen system 10 is further illustrated. FIG. 7 diagrammatically shows projection screen 122 unwinding from roller 120 installed within housing 12 and passing through gap 172. As closure panel 166 is mounted to side wall 16, gap 172 is provided between the edge of panel 166 and side wall 18. Depending on the requirements of a user of system 10, the viewing surface of screen 122 may be furnished on either surface 183 or surface 184. In screens fabricated with only one surface being a viewing surface, the direction that surface faces is controlled by the manner in which screen 122 is wrapped around roller 120. In the diagrammatic view of FIG. 8, closure panel 166 is mounted to side wall 18 and consequently projection screen 122 unwinding from roller 120 passes through gap 172 formed between the edge of panel 166 and side wall 16. The viewing direction of screen 122 in FIG. 8 may be from either side.

The structure of projection screen system 10 will be further understood in view of the following explanation of its installation and operation. A first stage of installation typically involves mounting an assembly including housing 12 to the structure, such as to a beam above the room in which system 10 is intended to be used. After end caps 27 and 28 and junction box 40 are preinstalled or fastened to the housing ends and top wall 14, respectively, end caps 27, 28 may be used to mount this screen assembly to the structure. At this stage of installation, the remainder of projection screen system 10 is not installed within housing 12. For example, roller 120 with projection screen 122, as well as roller mounting brackets 102 and 104, have yet to be installed, and for that matter may be safely held in storage at another location where it is clear of the risk of damage from the construction site environment. After housing 12 is secured to the structure, an electrical conduit is routed through entry hole 55 and into junction box 40. After an electrician removes cover plate 59 and electrically interconnects lead wires 67 to the appropriate wires of the electrical conduit, socket portion 65 is snap fit into opening 62 of junction box 40 and cover plate 59 is fastened to flange 44.

Projection screen assembly 100 is subsequently installed to the previously installed housing assembly. This installation step, which may occur immediately after housing 12 installation but normally is delayed until construction of the building is essentially complete, begins with roller mounting brackets 102 and 104 separated from roller 120. Roller bracket 102 is manipulated by an installer such that attachment flange 106 rests substantially flush with the interior surface of housing top wall 14 between lipped projections 80 and 84. Due to the span of attachment lugs 110 and 112 being larger than the gap between lip portions 82 and 86, to so manipulate bracket 102 an installer must arrange bracket 102 in a rotational orientation different from the installed arrangement shown in FIG. 1, such as about a forty-five degree rotation counter-clockwise from the perspective of a FIG. 2 viewer therefrom. As bracket 102 is then rotated (in a clockwise direction from the perspective of a FIG. 2 viewer) while being held at the same elevation, attachment lugs 110, 112 are rotated into the insertion spaces between top wall 14 and lip portions 82 and 86. The truncated corner portions 113 and 114 do not engage the flanges of the lipped projections and thereby do not prevent this rotational insertion of the attachment lugs 110 and 112. The underside of attachment lugs 110 and 112 abut the upper surfaces of lips 82 and 86 to prevent bracket 102 from falling out from housing 12.

After bracket 104 is mounted to housing 12 in a similar fashion, namely by first positioning it in a rotational offset arrangement and rotating it such that the attachment lugs of its attachment flange insert and engage the attachment lips 82 and 86, the roller 120 and its associated mounting accessories may be installed between the mounted brackets. The longitudinal position of roller 120 may be adjusted along the length of housing 12 by sliding brackets 102 and 104 within the channel defined between projections 80 and 84. When the proper longitudinal positioning of screen 122 has been achieved, the set screws through the attachment flanges of each of the roller mounting brackets may be tightened to lock brackets 102 and 104, and thereby lock screen 122 in its longitudinal position.

Next, an operator may take the power connector 70 attached to power cord 74 and simply plug it into the exposed socket portion 65 of power connector 64. It will be appreciated that no electrician is required for this plug insertion, but rather a person with minimal mechanical aptitude may complete the circuiting of electrical motor 76 with the power supply.

The next installation step is to mount bottom closure panel 166. An installer may simply maneuver closure panel 166 such that hook end 170 fits over lip projection 154. This positioning may be performed by tilting upward the end of the panel opposite attachment member 168 and then lowering it after the hooking process is complete. After the closure panel has been manipulated such that the brackets mounted in channel 180 engage the apertures of end caps 27 and 28, installation is complete. Subsequent operation of motor 76 allows roller 120 to revolve, which in turn causes projection screen 122 to unwind therefrom and pass down through gap 172 to a lowered position where an image can be projected on its surface for viewing. Motor 76 is reversible to wind screen 122 around roller 120 to raise screen 122.

It will be recognized that if an installer wishes to have the screen unwind from the opposite side of roller 120, the screen assembly may be flipped and the closure panel 166 mounted to lipped projection 160. Housing 12 need not be removed from its installed position to achieve this modification.

While this invention has been shown and described as having multiple designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A screen system comprising
   a screen housing having first and second ends and defining an interior region,
   a screen positioned in the interior region of the housing, and
   a screen mount including first and second screen mount members supported by the screen housing in positions spaced apart from the first and second ends of the screen housing, the screen mount being coupled to the screen to support the screen in the screen housing, at least one of the first and second screen mount members being movable relative to the screen housing while supported by the screen housing.

2. The screen system of claim 1, wherein at least one of the first and second screen mount members includes an interactive member that engages an interactive member of the housing to support said screen mount member from the screen housing without the use of a fastener.

3. The screen system of claim 1, wherein said screen mount member that is movable relative to the screen housing is slidable relative to the screen housing while supported by the screen housing.

4. The screen system of claim 1, wherein the screen housing includes a longitudinal axis and a longitudinal length and the first and second screen mount members and the screen have a combined longitudinal length that is less than the longitudinal length of the screen housing.

5. The screen system of claim 1, wherein the screen housing and at least one of the first and second screen mount members includes means for supporting said screen mount member without the use of a tool.

6. The screen system of claim 5, wherein support means includes a channel and a lug positioned in the channel.

7. A screen system comprising
a screen housing having first and second ends and a plurality of interactive members, the screen housing defining an interior region,
a screen positioned in the interior region of the screen housing, and
a first screen mount member configured to support the screen in the screen housing, the first screen mount member including a plurality of interactive members, rotation of the first screen mount member relative to the screen housing engaging the interactive members of the first screen mount member with the interactive members of the screen housing to support the first screen mount member relative to the screen housing.

8. The screen system of claim 7, wherein the first screen mount member is substantially perpendicular with a longitudinal axis of the screen housing when the interactive members of the first screen mount member are engaged with the interactive members of the screen housing.

9. The screen system of claim 7, wherein the screen housing further includes a longitudinally extending wall and the interactive members of the screen housing are integral with the longitudinally extending wall.

10. The screen system of claim 7, further comprising a fastener positioned to block rotation of the first screen mount member relative to the screen housing.

11. The screen system of claim 7, wherein the first screen mount member is configured to slide relative to the screen housing.

12. The screen system of claim 7, wherein the screen housing includes a longitudinal axis and a transverse width of the first screen mount member increases during said rotation of the first screen mount member.

13. The screen system of claim 12, wherein the interactive member of the fist screen mount member cooperate to define the transverse width of the first screen mount.

14. A screen system comprising
a screen housing having first and second ends and defining an interior region,
a screen positionable in the interior region of the screen housing, and
first and second screen mount members configured to support the screen in the interior region of the screen housing, the screen housing being configured to support the first and second screen mount members before the screen is supported by the first and second screen mount members.

15. The screen system of claim 14, wherein the screen is supportable by the first and second screen mount members while the first and second screen mount members are supported by the screen housing.

16. The screen system of claim 14, wherein at least one of the first and second screen mount members are moveable relative to the screen housing while supported by the screen housing.

17. The screen system of claim 16, wherein at least one of the first and second screen mount members is slidable relative to the screen housing while supported by the screen housing.

18. The screen system of claim 14, wherein the first and second screen mount members are completely positioned in the interior region of the screen housing.

19. The screen system of claim 18, wherein the screen housing includes a longitudinal axis and a longitudinal length between the first and second ends of the screen housing, the first screen mount member includes a first face, the second screen mount member includes a second face, the first and second screen mount members are supportably by the screen housing so that the first and second faces are perpendicular to the longitudinal axis and face away from each other, a longitudinal distance between the first and second faces being less than the longitudinal length of the screen housing.

20. The screen system of claim 14, wherein at least one of the first and second screen mount members is capable of movement relative to the screen housing when supported by the screen housing, further comprising a fastener positionable to block the movement of said screen mount member relative to the screen housing when the screen is supported by the first and second screen mount members.

* * * * *